United States Patent [19]

Nimz et al.

[11] Patent Number: 4,894,916
[45] Date of Patent: Jan. 23, 1990

[54] ADJUSTABLE STABILIZER WHEEL

[76] Inventors: Harold Nimz; P. Jack Morales, both of 13926 SE. Powell, Portland, Oreg. 97236

[21] Appl. No.: 150,848
[22] Filed: Apr. 14, 1988
[51] Int. Cl.[4] .............................................. A01G 3/06
[52] U.S. Cl. ...................................... 30/298.4; 30/290; 30/293; 30/DIG. 5; 56/DIG. 9; 56/DIG. 20
[58] Field of Search ............. 30/286, 289, 290, 296 A, 30/276, DIG. 5, 296 R, 293; 56/12.7, 16.7, DIG. 20, DIG. 9

[56] References Cited

U.S. PATENT DOCUMENTS

| | | | |
|---|---|---|---|
| 2,149,025 | 2/1939 | Marion et al. | 30/276 |
| 2,472,972 | 6/1949 | Hearn | 30/276 |
| 2,592,450 | 4/1952 | Mjelva | 30/276 |
| 2,708,335 | 5/1955 | Newton | 56/12.7 |
| 2,718,742 | 9/1955 | Tangeman | 30/276 |
| 4,182,100 | 1/1980 | Letter | 56/16.7 |
| 4,286,675 | 9/1981 | Tuggle | 30/347 X |
| 4,442,659 | 4/1984 | Enbusk | 56/12.7 |
| 4,566,189 | 1/1986 | Muto | 30/276 |
| 4,712,363 | 12/1987 | Claborn | 56/16.7 |

Primary Examiner—Frank T. Yost
Assistant Examiner—Y. Lin

[57] ABSTRACT

The invention comprises an improved adjustable stabilizer wheel which can be easily attached to a weed trimmer to reduce the weight of the trimming device while one is operating the trimmer or detached from the weed trimmer for storage.

3 Claims, 2 Drawing Sheets

4,894,916

ADJUSTABLE STABILIZER WHEEL

BACKGROUND OF THE INVENTION

Holding a weed trimmer for trimming the grass or weeds in long hours has been recognized as a boring and tiring work for women as well as men. Some prior art has already introduced a supplemental structure to the trimmer to help relieve the burden imposed on users. However, most of them are so complex that they do not resolve the problem, therefore, having a portable, easy-to-carry structure which can be adjustably attached to or detached from any weed trimmer would be most desirable and beneficial.

BRIEF SUMMARY OF THE INVENTION

It is therefore, an object of the present invention to provide a much more versatile garden and lawn tool. It is another object of the present invention to insure a safer and easier way to operate the grass and weed trimmer. The present invention can be used to trim against a building, by simply running the wheel against a wall or fence.

It is another object of the present invention to reduce the weight when trimming apparatus is in use and balance the weight properly. Women can operate the grass and weed trimmer and not notice the weight.

It is another object of the present invention to provide a variety of different material to make a better wheel and bracket. The invention can be made from metal, hard rubber, plastic or aluminum.

It is another object of the present invention to maintain correct distance when trimming grass next to a vertical surface or on the horizontal, as in edging the grass next to the sidewalk.

It is another object of the present invention to provide an apparatus which is durable and simple in construction and is readily and safely maneuverable.

BRIEF DESCRIPTION OF THE DRAWINGS

Other objects and advantages will be evident from the following specifications which are illustrated by the accompanying drawings, wherein.

DETAILED DESCRIPTION OF THE PREFERRED EMBODIMENTS

Figure 1:
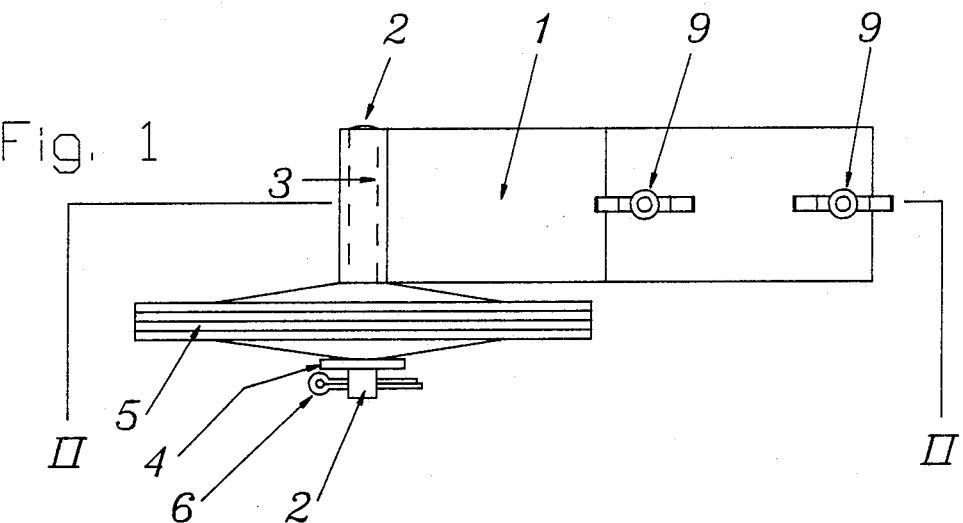
FIG. 1 is top view of the implement showing wheel secured to bracket, with cotter key.
Figure 2:
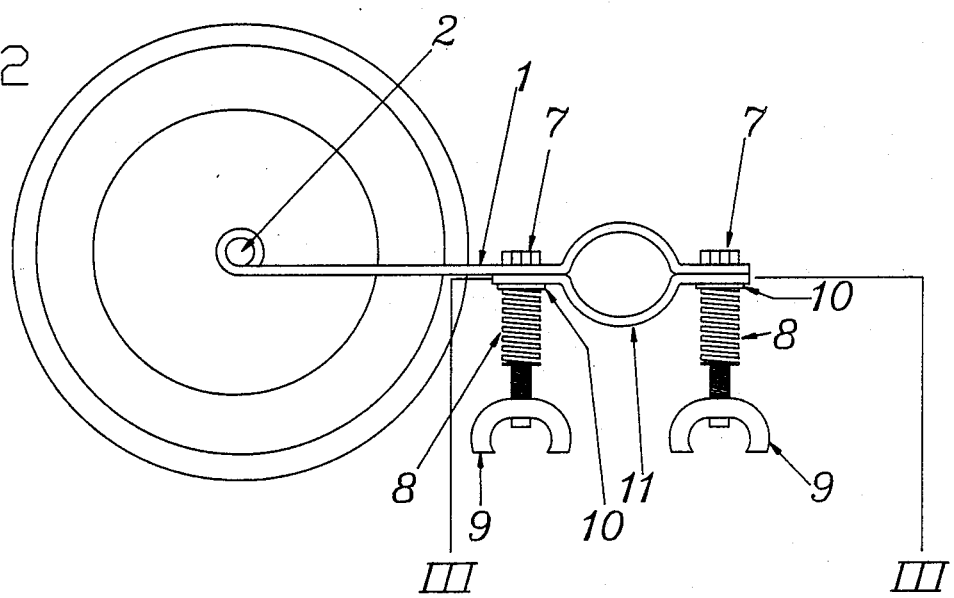
FIG. 2 is a side sectional view taken on the line II—II of FIG. 1.

Continuing with a more detailed description of the drawing. FIG. 1 denotes generally the frame or body of the bracket which consists of a flat 6" by 2" plate 1. A tip or wear pin 2 of extra hard metal is welded to the bracket 1 to reduce wear. The frame 1 is provided with a straight slot 3 as seen in FIG. 2. The tip or wear pin 2 is fitted outwardly through the slot 3 and passes through a registering opening in the bracket. The inner end of the tip or wear pin 2 passes also through said metal wheel 5 and extends ⅛" passes the metal wheel which is secured with a cotter key 6 and spacer 4. FIG. 2 shows the bracket 1 with clamp 11 on the opposite end from the wheel. The clamp fits closely against and around the bottom of a shaft of a weed and grass trimmer, with a threaded rod 7 extending through the corresponding ends of the bracket 1 which is secured with a small tension coil 8 and a spacer 10 to better adjust and stabilize tension coil 8. Rod 7 is tightened with a wing nut 9.

Figure 3:
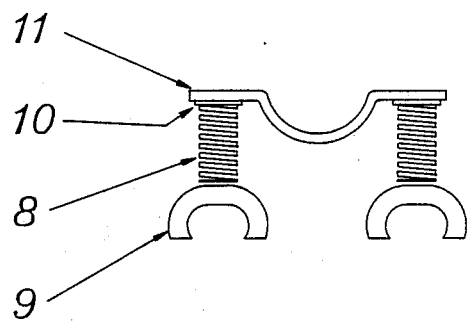
FIG. 3 is a side sectional view taken on the line III-—III of FIG. 2.

FIG. 3 shows a side view the clamp 11 with the wing nuts 9, tension coils 8 and spacers 10.

Figure 4:
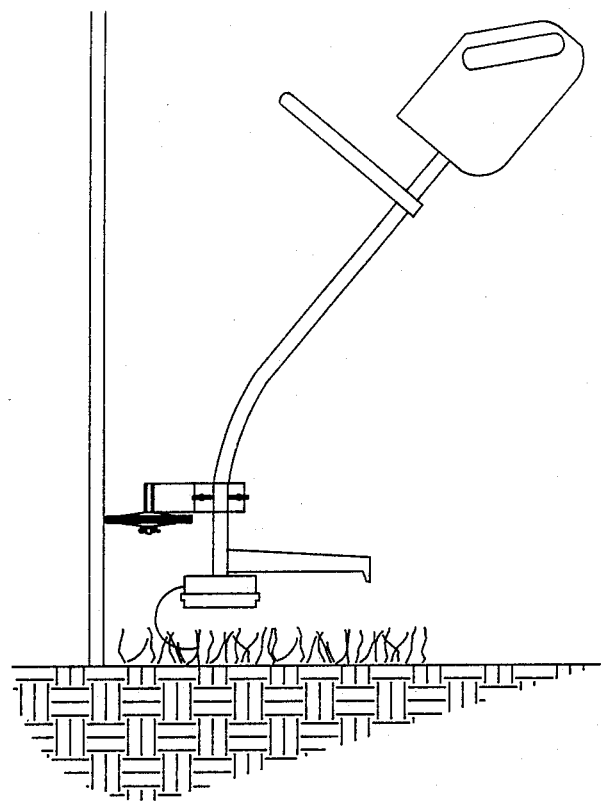
FIGS. 4 and 5 are the whole views of the trimmer with a stabilizer wheel.
Figure 5:
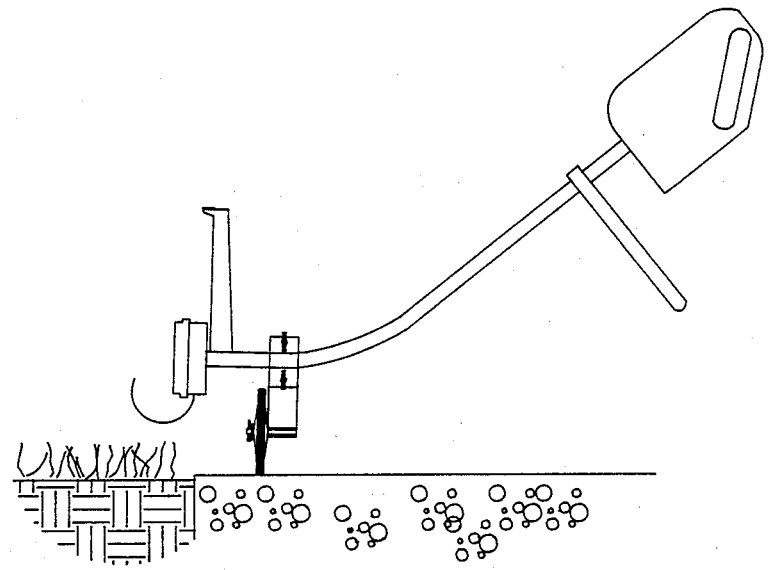

In FIG. 4, the stabilizer wheel is attached to the weed trimmer and rides along a fence or building during operation. In FIG. 5, the stabilizer wheel rides along the ground or side walk.

Although the invention has been described with reference to the preferred embodiments disclosed herein, it will be apparent to those of skill in the art that substitutions and modifications are possible without departing from the scope of the invention as set forth in the claims.

What is claimed is:

1. An improved weed trimming device comprising:
   an elongated shaft,
   a nylon cutting head,
   a handle,
   a portable wheel stabilizer,
   wherein said elongated shaft having one end and an opposite end, said handle is connected to said one end for holding and said nylon cutting head is fixed at the opposite end for weed trimming, and said portable wheel stabilizer is adjustably attached to said shaft proximate said nylon cutting head,
   whereby the wheel stabilizer can be placed against a surface while a trimming operation is being performed, said portable wheel stabilizer comprising,
   a bracket having a first end and a second end opposite to said first end in a longitudinal direction,
   a cylindrical slot is formed at said first end such that an axial pin, consisting of a top portion and bottom portion, having its bottom portion snuggly inserted in said cylindrical slot,
   said axial pin having said top portion fitted into a central opening of a wheel, a cotter pin securing said wheel to said axial pin, said second end of said bracket forming a half circle geometry to receive said shaft,
   a clamping means cooperating with said bracket to hold said portable wheel stabilizer on said shaft.

2. The improvement according to claim 1, wherein said bracket is 6" by 2".

3. The improvement according to claim 1, wherein the diameter of said wheel is 6".

* * * * *